United States Patent
Xun et al.

(10) Patent No.: US 9,146,794 B2
(45) Date of Patent: Sep. 29, 2015

(54) ENHANCED ARBITRATION PROTOCOL FOR NODES IN A CLUSTER

(71) Applicant: Microsoft Corporation, Redmond, WA (US)

(72) Inventors: Lu Xun, Redmond, WA (US); Mihail Gavril Tarta, Sammamish, WA (US); Yang Li, Redmond, WA (US); Gopal Kakivaya, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 332 days.

(21) Appl. No.: 13/632,950

(22) Filed: Oct. 1, 2012

(65) Prior Publication Data
US 2014/0095930 A1    Apr. 3, 2014

(51) Int. Cl.
   G06F 11/00    (2006.01)
   G06F 11/07    (2006.01)
   H04L 12/24    (2006.01)

(52) U.S. Cl.
   CPC ........ G06F 11/0709 (2013.01); G06F 11/0757 (2013.01); H04L 41/0645 (2013.01); H04L 41/0659 (2013.01)

(58) Field of Classification Search
   CPC ............ G06F 11/0709; G06F 11/0757; G06F 11/1425; H04L 41/0654; H04L 41/0659; H04L 41/0645
   See application file for complete search history.

(56) References Cited

U.S. PATENT DOCUMENTS

| | | | |
|---|---|---|---|
| 5,239,630 A | 8/1993 | Lary et al. | |
| 6,279,032 B1 * | 8/2001 | Short et al. | 709/209 |
| 6,487,622 B1 | 11/2002 | Coskrey, IV et al. | |
| 7,774,469 B2 | 8/2010 | Massa et al. | |
| 7,840,833 B2 | 11/2010 | Tripathi et al. | |
| 8,074,109 B1 * | 12/2011 | Roffe | 714/11 |
| 8,108,715 B1 | 1/2012 | Agarwal | |
| 8,990,434 B2 * | 3/2015 | Hasha et al. | 709/251 |
| 2003/0023680 A1 * | 1/2003 | Shirriff | 709/204 |
| 2008/0288646 A1 * | 11/2008 | Hasha et al. | 709/228 |
| 2009/0019098 A1 * | 1/2009 | Gunda et al. | 707/205 |
| 2010/0107002 A1 | 4/2010 | Kakivaya et al. | |
| 2010/0250750 A1 * | 9/2010 | Massa et al. | 709/226 |
| 2012/0192006 A1 * | 7/2012 | Qi et al. | 714/6.22 |
| 2013/0111261 A1 * | 5/2013 | Dalton | 714/4.11 |
| 2013/0297976 A1 * | 11/2013 | McMillen | 714/43 |

OTHER PUBLICATIONS

Vogels, et al., "The Design and Architecture of the Microsoft Cluster Service—A Practical Approach to High-Availability and Scalability", In Proceedings of the Twenty-Eighth Annual International Symposium on Fault-Tolerant Computing, Jun. 23, 1998, 10 pages.
Ucar, Filiz, "A Fault Tolerant Distributed Scheduling Algorithm", Retrieved on: Jul. 11, 2012, Available at: http://courses.cs.vt.edu/cs5204/archive/Fall2000/Ucar.pdf.

* cited by examiner

*Primary Examiner* — Marc Duncan
(74) *Attorney, Agent, or Firm* — Ben Tabor; Stein Dolan; Micky Minhas

(57) ABSTRACT

Arbitrating node failures. A method includes determining at a first node that communication to a second node has been lost. The method further includes sending an arbitration request to a plurality of arbitrators. The method further includes receiving from the plurality of arbitrators a sufficient number of arbitration reply grant messages to have arbitration reply grant messages from a quorum of the arbitrators. As a result of receiving a sufficient number of arbitration reply grant messages to have arbitration reply grant messages from a quorum of the arbitrators, the method further includes declaring the second node down.

18 Claims, 5 Drawing Sheets

ENHANCED ARBITRATION PROTOCOL FOR NODES IN A CLUSTER

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Computing systems that are connected to each other can often communicate using lease protocols to establish failure detection between computing systems. The basic usage of a lease layer is for an application running on one machine to detect when an application running on another machine has stopped functioning due to the entire machine being down, a communication problem between machines, or the machine being up, but an application on the machine not functioning. Computing systems that are connected to each other will sometimes experience failure when trying to communicate with each other. This can be due to issues with the communication channel between the computing systems, or in some cases, because one of the computing systems has gone down and become nonfunctional in the communication process. Arbitration is an important aspect for lease protocols, which is in turn used for failure detection in distributed system. For example, if a node in a distributed system experiences difficulty communicating with another node, then the node can submit an arbitration request to a third system which functions as an arbitrator. If the arbitrator receives arbitration requests from one or both computing systems, then the arbitrator can declare one of the nodes as down to release the other node from any leases with the other node to allow the other node the ability to make alternate arrangements in a node failure recovery operation for accomplishing computing tasks that require the node to communicate with other nodes. Presently, embodiments allow the node that first sends an arbitration request to live while declaring the other node as down.

Typically, the arbitrator will wait for a predetermined amount of time after receiving an arbitration request to allow the other node an opportunity to also send an arbitration request. However, there is some desire to balance the length of time that an arbitrator waits for the other node to send an arbitration request as waiting long periods of time allows for more communication channel problems to be detected (rather than simply declaring the other node as down, which will eventually cause the other node to go down) while waiting for shorter periods of time shortens the time for node failure recovery.

One issue that arises with the use of arbitrators occurs when an arbitrator goes down. If the arbitrator goes down, then it can be difficult, or impossible for other nodes to initiate node failure recovery so as to be released from a lease to another node that may have gone down.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment. The method includes acts for arbitrating node failures. The method includes determining at a first node that communication to a second node has been lost. The method further includes sending an arbitration request to a plurality of arbitrators. The method further includes receiving from the plurality of arbitrators a sufficient number of arbitration reply grant messages to have arbitration reply grant messages from a quorum of the arbitrators. As a result of receiving a sufficient number of arbitration reply grant messages to have arbitration reply grant messages from a quorum of the arbitrators, the method further includes declaring the second node down.

Another embodiment illustrated herein includes a method that may be practiced in a distributed computing environment. The method includes acts for arbitrating node failures. The method includes determining at a first node that communication to a second node has been lost. The method further includes sending an arbitration request to a plurality of arbitrators. The method further includes receiving from the plurality of arbitrators one or more arbitration reply grant messages but an insufficient number to have arbitration reply grant messages from a quorum of the arbitrators. As a result of receiving an insufficient number of arbitration reply grant messages to have arbitration reply grant messages from a quorum of the arbitrators, the method further includes performing priority actions to facilitate either the first node or second node obtaining a sufficient number of arbitration reply grant messages to have arbitration reply grant messages from a quorum of the arbitrators.

Yet another embodiment illustrated herein includes a method that may be practiced in a distributed computing environment. The method includes acts for arbitrating node failures. The method includes determining at a first node that communication to a second node has been lost. The method further includes sending an arbitration request to one or more arbitrators. The method further includes at a first node determining that a suspend timeout has been reached. As a result of determining that a suspend timeout has been reached, the method further includes stopping processing of a given set of work but continuing to wait for arbitration replies.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein include functionality to increase the efficiency and/or reliability of arbitration processes for distributed computing environments. A previous arbitration mechanism is described in U.S. Pat. No. 7,934,118 issued on Apr. 26, 2011 titled "Failure Notification In Rendezvous Federation." In particular, some embodiments may include functionality to reduce the probability of arbitration failure when some arbitrators are down. This may be done by using a plurality of arbitrators and requiring a quorum of the plurality of arbitrators to approve or deny arbitration requests. Some embodiments may include functionality to reduce the probability of arbitration failure when some arbitrators are down. This may be done by establishing a priority of nodes which requires un-preferred nodes to revoke any arbitration requests when the un-preferred nodes receive a rejection to their arbitration request. Some embodiments may include functionality to reduce failure detection time when message delay is high. This may be done by implementing two different timeout waiting periods where expiration of the first waiting period causes a node to suspend operations on a given set of work but does not cause the node to go down, but where expiration of the second timeout causes the node to go down.

Some embodiments may be configured to be implemented in Federated rings. Federated rings are described in detail in U.S. patent application Ser. No. 11/936,589 filed on Nov. 7, 2007 titled "Maintaining Consistency Within A Federation Infrastructure" and U.S. patent application Ser. No. 12/038, 363 filed on Feb. 27, 2008 titled "Neighborhood Maintenance In The Federation" both of which are incorporated herein by reference in their entireties.

Figure 1:
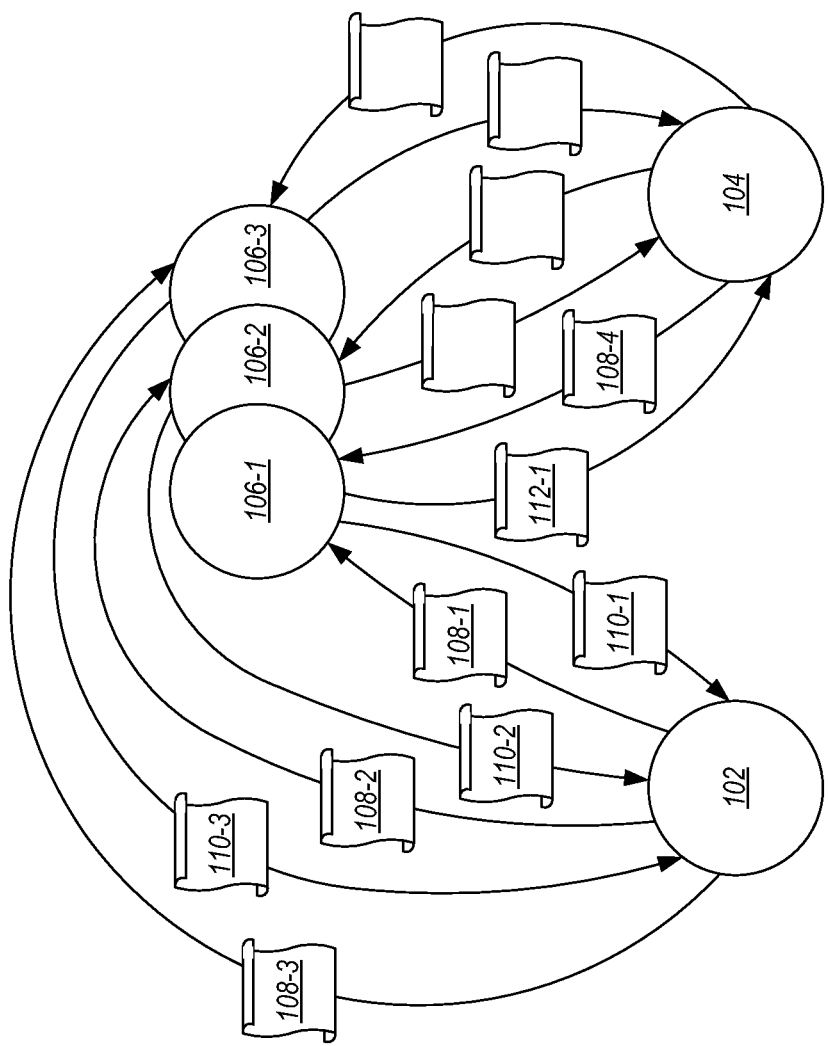
FIG. 1 illustrates nodes and arbitrators in a distributed computing environment.

Referring now to FIG. 1, an example is illustrated. FIG. 1 illustrates two nodes, node 102 and node 104, that are configured to communicate with each other. For example, the two nodes 102 and 104 may have established leases on each other for failure detection. FIG. 1 further illustrates a set of arbitrators 106-1, 106-2 and 106-3 that are configured to arbitrate between the two nodes 102 and 104 when the two nodes 102 and 104 cannot communicate with each other. In particular, when the two nodes cannot communicate with each other, an arbitration mechanism of the arbitrators 106-1, 106-2 and 106-3 is used to determine whether one or both of the nodes should go down. While FIG. 1 only illustrates three arbitrators, it should be appreciated that other embodiments may have more than three arbitrators where a quorum is at least a majority of all the arbitrators. In the illustrated example, the arbitration is done by a plurality of arbitrators. This may be done for scalability purposes and/or to avoid a single point of failure. The arbitrators 106-1, 106-2 and 106-2 are configured as voters in the system.

The nodes 102 and 104 will establish a monitor/subject relationship. For example, node 102 may be a monitor and node 104 a subject. Note that the monitor/subject relationship is typically bidirectional in that for some contexts, node 102 may be a subject where node 104 is the monitor. Based on the monitor/subject relationship, when the monitor (i.e. node 102) cannot communicate with the subject (i.e. node 104), it will report the subject as unhealthy to the arbitrators 106-1, 106-2, and 106-3. The request can be granted, in which case the participant arbitrators mark the reported node 104 as unhealthy. If the request is instead rejected, the monitor node 102 itself goes down.

The arbitration mechanism ensures that at least one node goes down (either the monitor or the subject). At most, one node will continue to live.

In general, if and only if a node gets a majority quorum of grants from the arbitrators 106-1, 106-2 and 106-2, it can continue to live. This ensures that if a pair of nodes are doing arbitration, only one node can continue to live and it can declare the other node as down correctly. For the arbitrators to make consistent grant/reject decisions, they need to remember every decision made until a record recording such a decision is no longer useful (when the node declared to be down must have gone down). For votes that have persistent storage, such records are saved. Upon restart, the system will reject every request until every record it could have had before the restart has expired (i.e., the node will wait for the maximum duration a node lost arbitration could live).

When nodes have need for arbitration, various messages can be exchanged. For example, an arbitrate request message can be sent from a monitor node to one or more arbitrators. For example, node 102 may send arbitration requests 108-1, 108-2 and 108-3 to the arbitrators 106-1, 106-2 and 106-3.

Arbitrate reply grant messages 110-1, 110-2 and 110-3, granting an arbitration request, may be sent from the arbitrators 106-1, 106-2 and 106-3 to the monitor node 102. If an arbitrator has already issued an arbitration reply grant message for one of the two nodes involved in an arbitration request, and then receives an arbitration request for the other node involved in the arbitration request, it will then issue an arbitration reply deny message. For example, FIG. 1 illustrates an arbitration reply deny message 112-1 being sent to the node 104 in response to the arbitration request 108-4 due to the arbitration reply grant message 110-1 having already been sent to the node 102.

When a node has a sufficient number of arbitration reply grant messages (in the example illustrated in FIG. 2) it will assume that it has won the arbitration and will continue processing work under the assumption that the other node 104 has gone down.

Using a plurality of arbitrators in this fashion allows for a more robust system which is less prone to failure should an arbitrator be lost. Such systems may also be more scalable.

One issue that can arise using the mechanism described above is that if some voters are down and unable to send arbitration replies, embodiments may arrive at a scenario where both nodes 102 and 104 get some arbitration reply grants from some arbitrators but arbitration reply reject messages from the others, such that neither of the noes 102 or 104 get enough reply grant messages to win the arbitration, which will cause both nodes to fail. Such scenarios are generally rare as they only happen when there is a network partition or heavy load on the nodes (that caused lease loss). This may occur, for example, when two nodes start arbitration at about the same time. However, it may still be desirable to prevent such scenarios whenever possible.

As one solution to these scenarios, some embodiments may be configured such that among any pair of nodes having a lease relationship, one node is designated as the preferred node. Preference may be determined in a number of different ways. In some embodiments, the preferred node is the node with the numerically smallest node identifier. However other embodiments may use other methods of preferring one node to another. For example, the preferred node may be the node with the largest node identifier or some other method.

If a non-preferred node gets an arbitration rejection, it knows that the preferred node is also alive and therefore it should lose the arbitration. This means that it will perform a new round of arbitration to send a revert request to revert any arbitration reply grant messages it has already received from other arbitrators. When a revert request is received by an arbitrator, the arbitrator will remove the corresponding record indicating which node has received an arbitration reply grant message, such that the arbitrator is then free to send arbitration reply grant messages to other nodes.

On the other hand, if a preferred node gets a rejection, it will keep retrying before the arbitration timeout, hoping that at certain point the arbitrator will get a revert request from the less preferred node and thus the arbitrator will be able to give the more preferred node an arbitration reply grant message.

Another issue that may arise relates to balancing responsiveness of a network with the ability to perform efficient recoveries from failures. This issue may arise in cases with multiple arbitrators or only a single arbitrator. Typically, a node will wait for a predetermined amount of time after sending an arbitration request to allow for the arbitrator to reply. However, there is some desire to optimize the length of time that a node waits for the reply from the arbitrator. In particular, shorter delay means faster failure detection and hence faster recovery after a node goes down, but may lead to unnecessary arbitration failure when there is large message delay or when the arbitrator is under heavy load. Longer waits will accommodate some of these replies but will increase recovery times when a bona fide failure occurs.

To address these issues, some embodiments may implement multiple timeouts as opposed to a single time out. In particular, embodiments may implement what are referred to herein as a suspend timeout and an arbitration timeout. The suspend timeout is a shorter timeout than the arbitration timeout.

Figure 2:
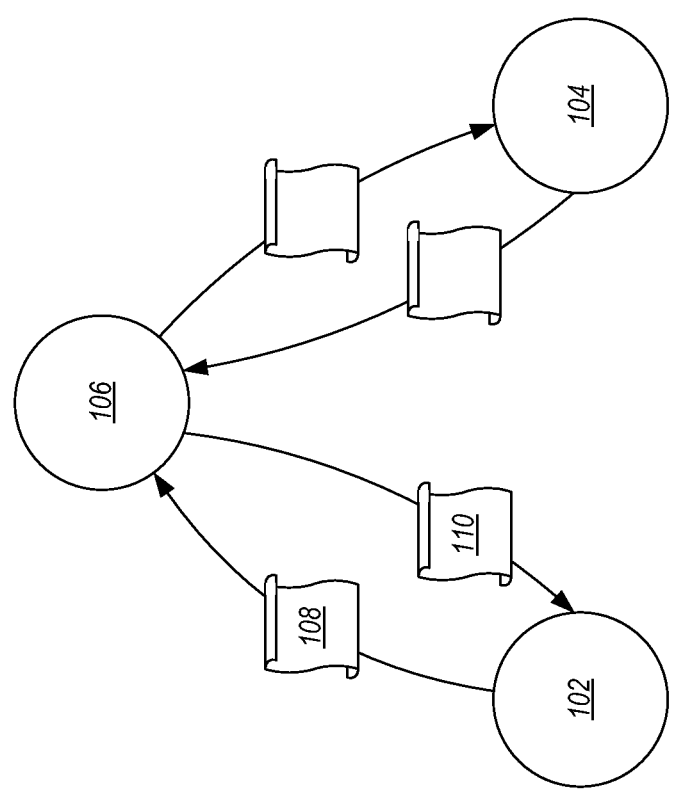
FIG. 2 illustrates nodes and an arbitrator in a distributed computing environment.

Referring to FIG. 2, an example is illustrated. The node 102 may send an arbitration request 108 to an arbitrator 106. The arbitrator 106 may not immediately reply to the arbitration request, but rather the reply may be delayed due to network or other issues. At the node 102, a timeout is reached. In this example, a suspend timeout is reached. As a result of reaching the suspend timeout, the node 102 will suspend a given set of operations. For example, the node 102 may suspend performing some set of work assigned to a node network. However, node 102 will not go down, and will not declare the other node 104, which is part of the arbitration request 108, as down, but rather will continue waiting. While the node continues to wait, there are three possible outcomes. The node 102 (1) may receive an arbitration reply grant message, (2) may receive an arbitration reply deny message, or (3) may reach an arbitration timeout. This means that if an arbitration grant reply message is taking a long time to be received, the node can still be operational after that, instead of killing itself unnecessarily. If the arbitration is indeed rejected however, the other side will be able to declare this node as down right after the suspend timeout, which means that the failure detection (and hence recovery) can still be fast.

If the node 102 receives an arbitration reply grant message, then the node will resume the given set of operations. In some embodiments, the node 102 will need to receive a quorum of arbitration reply grant messages to resume the given set of operations, such as for example, when multiple arbitrators are used (see e.g. FIG. 1). However, in other embodiments, such as where only a single arbitrator is used (see e.g. FIG. 2), a single arbitration reply grant message 110 may be sufficient to allow the node 102 to resume the given set of operations.

If the node 102 receives an arbitration reply deny message, then the node 102 will go down.

If the node 102 reaches an arbitration timeout, then the node 102 will go down. This may further result in recovery operations being performed to try to recover the arbitrator(s) in the system.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
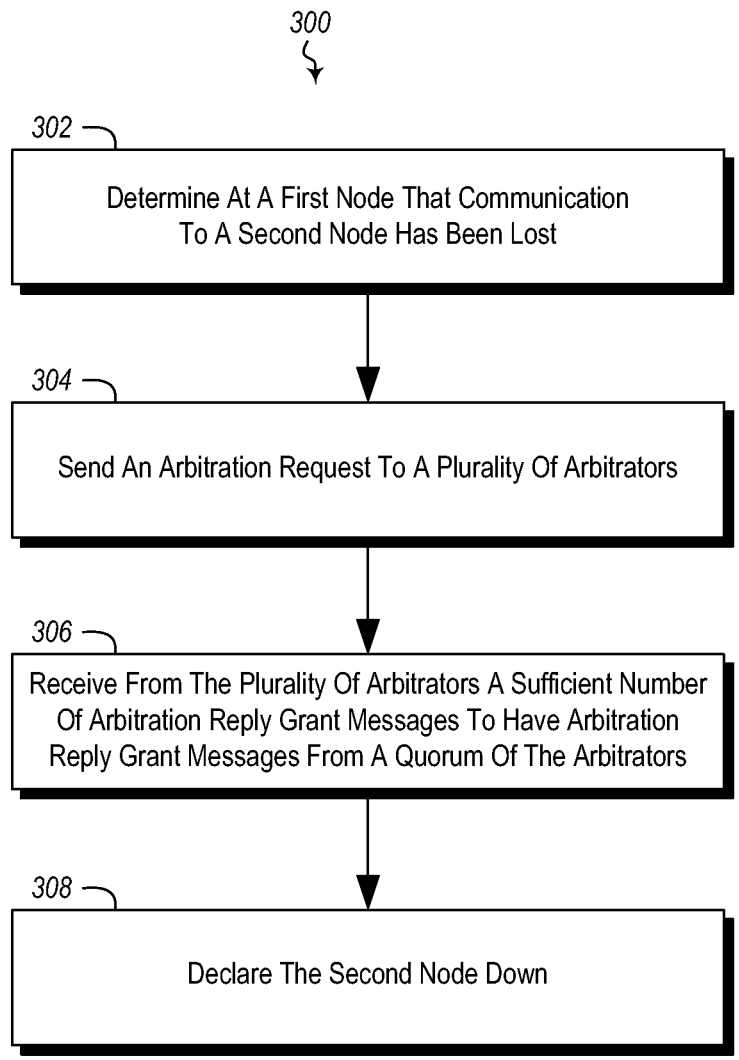
FIG. 3 illustrates a method of arbitrating node failures.

Referring now to FIG. 3, a method 300 is illustrated. The method 300 may be practiced in a distributed computing environment and includes acts for arbitrating node failures. The method includes determining at a first node that communication to a second node has been lost (act 302). For example, with reference to FIG. 1, node 102 may determine that communication to node 104 has been lost.

The method 300 may further include sending an arbitration request to a plurality of arbitrators (act 304). For example, as illustrated in FIG. 1, the node 102 sends arbitration requests 108-1, 108-2 and 108-3 to the arbitrators 106-1, 106-2 and 106-3 respectively. In some embodiments, sending an arbitration request to a plurality of arbitrators may be performed by sending a request to a super arbitrator, which then forwards the message, on the nodes behalf, to other arbitrators.

The method 300 further includes receiving from the plurality of arbitrators a sufficient number of arbitration reply grant messages to have arbitration reply grant messages from a quorum of the arbitrators (act 306). As a result of receiving a sufficient number of arbitration reply grant messages to have arbitration reply grant messages from a quorum of the arbitrators, the method 300 further includes declaring the second node down (act 308).

Figure 4:
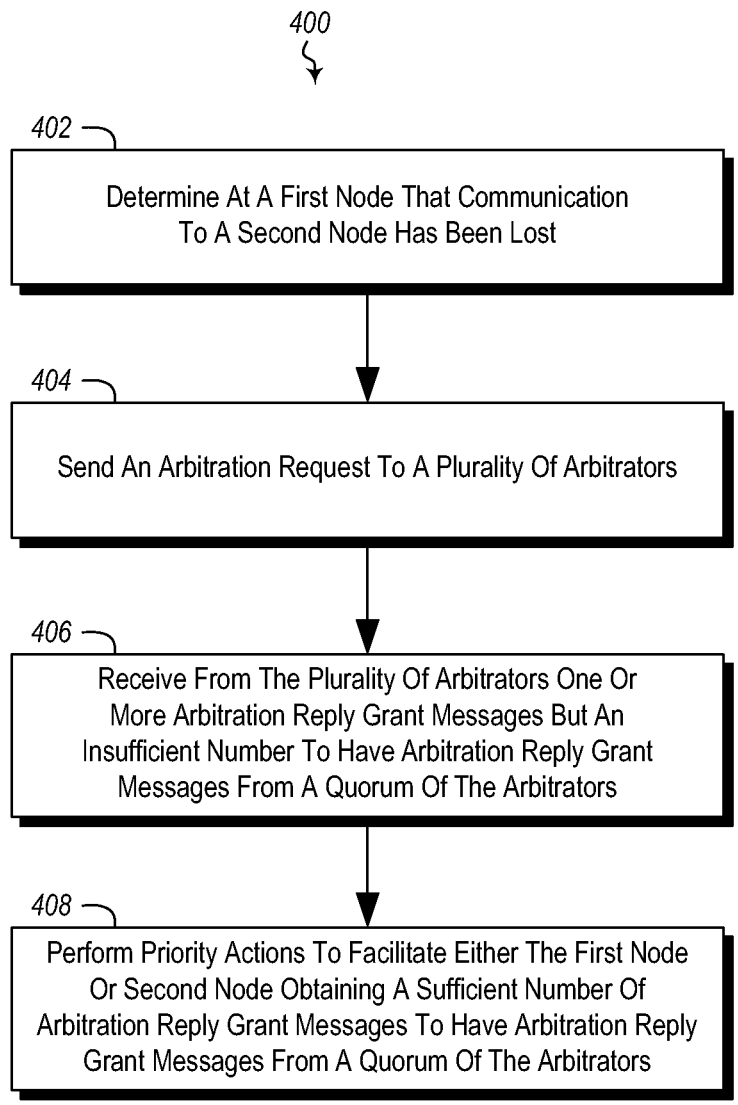
FIG. 4 illustrates another method of arbitrating node failures.

Referring now to FIG. 4, a method 400 is illustrated. The method 400 may be practiced in a distributed computing environment and includes acts for arbitrating node failures. The method 400 includes determining at a first node that communication to a second node has been lost (act 402). For example, node 102 may determine that communication to node 104 (see FIG. 1) has been lost.

The method 400 further includes sending an arbitration request to a plurality of arbitrators (act 404). For example, when node 102 determines that it has lost communication with node 104, it may send an arbitration request to the arbitrators 106-1, 106-2, and 106-3.

The method 400 further includes receiving from the plurality of arbitrators one or more arbitration reply messages but an insufficient number to have arbitration reply grant messages from a quorum of the arbitrators (act 406). For example, node 102 may receive an arbitration reply grant message from arbitrator 106-1, but receive arbitration reply deny messages from arbitrators 106-2 and 106-3.

As a result of receiving an insufficient number of arbitration reply grant messages to have arbitration reply grant messages from a quorum of the arbitrators, the method 400 may include performing priority actions to facilitate either the first node or second node obtaining a sufficient number of arbitration reply grant messages to have arbitration reply grant messages from a quorum of the arbitrators (act 408).

The method 400 may be practiced where if the first node is a preferred node, then the priority actions include continuing to retry arbitration requests. For example, if node 102 is preferred as between nodes 102 and 104, node 102 will continue to retry arbitration requests to try and obtain a sufficient number of arbitration reply grant messages to have a quorum.

Alternatively, if the first node is a not a preferred node, then the priority actions may comprise the first node revoking any arbitration reply grant messages that it has already received. For example, if node 104 is preferred as between nodes 102 and 104, node 102 may revoke any arbitration reply grant messages that it has already received by so indicating to the relevant arbitrators, thus freeing up the arbitrators to send arbitration reply grant messages to node 104.

Preference of nodes may be determined in a number of different ways. For example a node may be a preferred node by virtue of the fact that it has a higher node identifier than another node. However, this determination may be an arbitrary selection such that an equally valid method of determining priority may be by a node being a preferred node by virtue of the fact that it has a lower node identifier than another node. In yet another alternative embodiment, a node may be a preferred node based on the order that the node joined the distributed computing environment with respect to another node.

Figure 5:
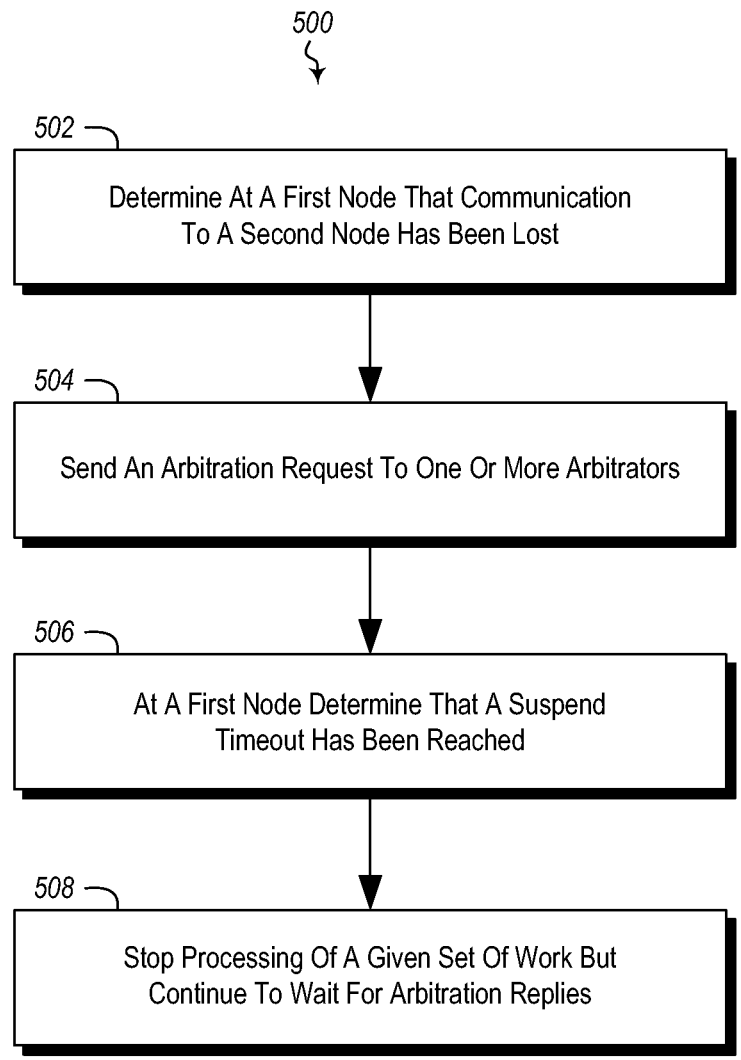
FIG. 5 illustrates yet another method of arbitrating node failures.

Referring now to FIG. 5, a method 500 is illustrated. The method 500 may be practiced in a distributed computing environment and includes acts for arbitrating node failures. The method 500 includes determining at a first node that communication to a second node has been lost (act 502). For example, as illustrated in FIG. 2, the node 102 may determine that communication has been lost to node 104.

The method 500 further includes sending an arbitration request to one or more arbitrators (act 504). For example, as a result of determining that the communication has been lost to node 104, node 102 may send an arbitration request to the arbitrator 106.

The method 500 further includes at a first node determining that a suspend timeout has been reached (act 506). For example, the node 102 may determine that a timeout period has been reached. In particular the node 102 may determine that a suspended time and has been reached.

As a result of determining that a suspend timeout has been reached, the method 500 further includes stopping processing of a given set of work but continuing to wait for arbitration replies (act 508). In particular, the node 102 may be processing some set of work which the distributed computing system has assigned. The node 102 will suspend processing this set of work after the suspend timeout has been reached.

The method 500 may further include, while waiting for arbitration replies, determining that an arbitration timeout has been reached and as a result causing the first node to go down. For example, the node 102 may continue to wait after the suspend timeout, and may reach an arbitration timeout. Reaching the arbitration timeout causes the first node 102 to go down.

Alternatively, while waiting for arbitration replies, the first node may receive an arbitration reply deny and as a result the first node will go down. For example, the node 102 may receive an arbitration reply deny message (such as the message 112-1 shown in FIG. 2) as a result of an arbitration reply grant message already having been sent to node 104.

Alternatively, while waiting for arbitration replies, the node 102 may receive a sufficient number of arbitration reply grant messages and as a result resume processing of the given set of work. For example, in the example shown in FIG. 2, the single arbitration reply grant passage would be sufficient to allow the node 102 to continue processing the given set of work. In the example illustrated and FIG. 1, two arbitration grant reply messages would be needed to allow the node 102 to continue processing work. Thus, embodiment may include receiving from a plurality of arbitrators a sufficient number of arbitration reply grant messages to have arbitration reply grant messages from a quorum of the arbitrators. The method may further include, as a result of receiving a sufficient number of grant messages, declaring the second node down. For example, node 104 may be declared down as a result of node 102 receiving a sufficient number of arbitration reply grant messages.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising one or more storage media having stored computer executable instructions that are executable by one or more processors of the computing system for implementing a method of arbitrating node failures in a distributed computing environment, wherein the method includes:
   determining at a first node that communication to a second node has been lost;
   sending an arbitration request to a plurality of arbitrators;
   receiving from the plurality of arbitrators a sufficient number of arbitration reply grant messages to have arbitration reply grant messages from a quorum of the arbitrators;
   as a result of receiving a sufficient number of arbitration reply grant messages to have arbitration reply grant messages from a quorum of the arbitrators, declaring the second node down; and
   prior to receiving from the plurality of arbitrators a sufficient number of arbitration reply grant messages to have arbitration reply grant messages from a quorum of the arbitrators, at a first node determining that a suspend timeout has been reached;
   as a result of determining that a suspend timeout has been reached, stopping processing of a given set of work but continuing to wait for arbitration replies.

2. The computing system of claim 1, the method further comprising an act of determining that a second timeout has been reached and as a result of the second timeout, causing the first node to stop the given set of work.

3. The computing system of claim 1, wherein the first node is enabled to receive from the plurality of arbitrators a sufficient number of arbitration reply grant messages to have arbitration reply grant messages from a quorum of the arbitrators as a result of the second node revoking any arbitration reply grant messages that the second node has already received.

4. The computing system of claim 3, wherein the second node revokes any arbitration reply grant messages that the second node has already received as a result of the second node being a less preferred node as compared to the first node and the second node receiving an arbitration reply deny message denying an arbitration request by the second node to an arbitrator.

5. The computing system of claim 4, wherein the second node is a less preferred node as compared to the first node as a result of the second node having a lower node identifier than the first node.

6. The computing system of claim 4, wherein the second node is a less preferred node as compared to the first node as a result of the second node having a higher node identifier than the first node.

7. The computing system of claim 4, wherein the second node is a less preferred node as compared to the first node as a result of the first node having joined the distributed environment prior to the second node.

8. A computing system comprising one or more storage media having stored computer executable instructions that are executable by one or more processors of the computing system for implementing a method of arbitrating node failures the method comprising:
   determining at a first node that communication to a second node has been lost;
   sending an arbitration request to a plurality of arbitrators;
   receiving from the plurality of arbitrators one or more arbitration reply grant messages but an insufficient number to have arbitration reply grant messages from a quorum of the arbitrators; and
   as a result of receiving an insufficient number of arbitration reply grant messages to have arbitration reply grant messages from a quorum of the arbitrators, performing priority actions to facilitate either the first node or second node obtaining a sufficient number of arbitration reply grant messages to have arbitration reply grant messages from a quorum of the arbitrators, wherein the priority actions include determining which of the first and second node is a preferred node and which of the first and second node is a non-preferred node and wherein the preferred node and the non-preferred node respond differently to at least an arbitration deny message.

9. The computing system of claim 8, wherein if the first node is a preferred node, then the priority actions comprise continuing to retry arbitration requests.

10. The computing system of claim 8, wherein if the first node is a not a preferred node, then the priority actions comprise the first node revoking any arbitration reply grant messages that it has already received.

11. The computing system of claim 8, wherein the first node is a preferred node by virtue of the fact that it has a higher node identifier than the second node.

12. The computing system of claim 8, wherein the first node is a preferred node by virtue of the fact that it has a lower node identifier than the second node.

13. The computing system of claim 8, wherein the first node is a preferred node based on the order that the first node joined the distributed computing environment with respect to the second node.

14. A computing system comprising one or more storage media having stored computer executable instructions that are executable by one or more processors of the computing system for implementing a method of arbitrating node failures the method comprising:
  determining at a first node that communication to a second node has been lost;
  sending an arbitration request to one or more arbitrators;
  at a first node determining that a suspend timeout has been reached;
  as a result of determining that a suspend timeout has been reached, stopping processing of a given set of work but continuing to wait for arbitration replies; and
  while waiting for arbitration replies, causing the first node to go down in response to either (1) a determination that an arbitration timeout has been reached, or (2) receiving an arbitration reply deny message denying the arbitration request.

15. The computing system of claim 14, further comprising: while waiting for arbitration replies, determining that the arbitration timeout has been reached.

16. The computing system of claim 14, further comprising: while waiting for arbitration replies, receiving the arbitration reply deny message denying the arbitration request.

17. The computing system of claim 14, further comprising while waiting for arbitration replies, receiving a sufficient number of arbitration reply grant messages and as a result resuming processing of the given set of work prior to the first node going down.

18. The computing system of claim 14, further comprising receiving from a plurality of arbitrators a sufficient number of arbitration reply grant messages to have arbitration reply grant messages from a quorum of the arbitrators for the second node.

* * * * *